(12) United States Patent
Olsommer

(10) Patent No.: US 8,557,481 B2
(45) Date of Patent: Oct. 15, 2013

(54) POLYMER-ELECTROLYTE FUEL CELL EXHIBITING REDUCED RISK OF INTERNAL SHORT CIRCUITING

(75) Inventor: David Olsommer, Attalens (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 331 days.

(21) Appl. No.: 12/532,338

(22) PCT Filed: Mar. 14, 2008

(86) PCT No.: PCT/EP2008/002055
§ 371 (c)(1),
(2), (4) Date: Mar. 11, 2010

(87) PCT Pub. No.: WO2008/125174
PCT Pub. Date: Oct. 23, 2008

(65) Prior Publication Data
US 2010/0173227 A1 Jul. 8, 2010

(30) Foreign Application Priority Data
Mar. 20, 2007 (FR) .................................. 07 02031

(51) Int. Cl.
*H01M 8/02* (2006.01)
*H01M 8/10* (2006.01)

(52) U.S. Cl.
USPC ............................ 429/514; 429/492; 429/457

(58) Field of Classification Search
USPC ......... 429/469, 457, 443, 509, 514, 492, 518; 427/115
See application file for complete search history.

(56) References Cited

U.S. PATENT DOCUMENTS

| | | | |
|---|---|---|---|
| 2003/0235744 A1* | 12/2003 | Pflaesterer | 429/35 |
| 2004/0096710 A1* | 5/2004 | Faita et al. | 429/13 |
| 2004/0137303 A1* | 7/2004 | Kuroki et al. | 429/35 |
| 2004/0146772 A1* | 7/2004 | Miyao et al. | 429/38 |
| 2004/0180255 A1* | 9/2004 | Maus et al. | 429/35 |
| 2005/0271929 A1* | 12/2005 | Sompalli et al. | 429/40 |
| 2006/0046131 A1 | 3/2006 | Frank et al. | |
| 2008/0057376 A1* | 3/2008 | Haufe et al. | 429/36 |

FOREIGN PATENT DOCUMENTS

| | | |
|---|---|---|
| DE | 199 26 027 | 11/2000 |
| DE | 20 2004 017 647 | 1/2005 |
| GB | 2 394 828 | 5/2004 |
| WO | WO 2005/006472 | 1/2005 |

OTHER PUBLICATIONS

Hylomar Product Data Sheet, YTM-Industrial. Obtained online on Oct. 16, 2010 from: http://www.ytm.fi/files/ytm/pdf/voitelu_kemikaalit/YTM_Hylomar_tiivistysaineet_ja_liimat.pdf.*

* cited by examiner

*Primary Examiner* — Kenneth Douyette
(74) *Attorney, Agent, or Firm* — Cozen O'Connor

(57) ABSTRACT

Fuel cell comprising a stack of bipolar plates (1) and polymer films (2), in which the polymer films comprise a lip (3) that overhangs on all sides relative to the adjacent bipolar plates (1).

9 Claims, 3 Drawing Sheets

POLYMER-ELECTROLYTE FUEL CELL EXHIBITING REDUCED RISK OF INTERNAL SHORT CIRCUITING

RELATED APPLICATIONS

This is a U.S. national stage under 35 USC §371 of application No. PCT/EP2008/002055, filed on Mar. 14, 2008.

This application claims the priority of French application no. 07/02031 filed Mar. 20, 2007, the entire content of which is hereby incorporated by reference.

FIELD OF THE INVENTION

The present invention relates to fuel cells with ion-exchange polymer membranes.

BACKGROUND OF THE INVENTION

A fuel cell is composed of a stack of individual electrochemical cells connected electrically in series and which, each, develop a certain voltage, in general of around 1 volt. The total voltage developed by the stack is therefore equal to the sum of the individual voltages, for example around 100 volts or a few hundred volts for fuel cells targeting applications in the transport field.

Each individual electrochemical cell is usually composed of the superposition of five layers: a polymer film of which one zone forms an ion-exchange membrane, two electrodes comprising chemical elements necessary for the development of the electrochemical reaction, such as for example platinum, and two gas diffusion layers that make it possible to ensure a homogeneous diffusion of the gases transported by the networks of bipolar plates over the whole of the surface of the ion-exchange membrane.

The supply of the gases is ensured by plates that are generally referred to as "bipolar plates" as they are in contact with the anode of one cell and with the cathode of the adjacent cell. Usually, the bipolar plates are composed of an electrically conductive material as it is necessary to ensure an electrical conduction from one cell to the other, the fuel cell being formed by individual electrochemical cells which are connected electrically in series.

Patent Application WO 2005/006472 describes a fuel cell conforming to the above description. FIG. 7, in particular, will be consulted, which shows a stack of individual cells. When the constituent material of the bipolar plates is an electrical conductor, as is most commonly the case, the visible faces of a fuel cell therefore have a voltage when the fuel cell is in service. On one side of the stack, this voltage may become very high, the maximum voltage being the nominal voltage of the fuel cell, namely, typically, greater than 100 volts. It is therefore necessary to encapsulate such a fuel cell to avoid any risk of accidental contact with the latter. This meets both a safety objective and an objective of proper functioning of the cell, as, if the cells were short-circuited, the functioning of the cell would be impaired.

SUMMARY OF THE INVENTION

One object of the present invention is to provide another practical solution to this problem of possible electrical contact with the bipolar plates when the fuel cell is not encapsulated, and also to the risk of short-circuiting between cells, a problem which may arise from accidental contact with foreign bodies.

Since the polymer film on which the ion-exchange part of the fuel cell is arranged forms a substrate which is by nature electrically non-conductive, it suffices to make the polymer films overhang relative to the bipolar plates in order to obtain a multitude of lips that are oriented substantially perpendicular to the surface of the edges of the bipolar plates, making a protuberance relative to the bipolar plates and thus giving the fuel cell a first level of protection against the drawbacks and risks described. As a variant, instead of the lip being formed by an extension of the polymer film, it is possible to implant an insert that forms a peripheral reinforcement associated with each polymer film and that overhangs relative to the bipolar plates, said reinforcement being made of an electrically non-conductive material.

Of course, it is possible, in addition, if it is desired, to encapsulate the fuel cell as is commonly carried out but the protection by the lips offers a first level of protection that is very useful, especially for maintenance operations where an operator gets close to the fuel cell while the latter is live. The fuel cell protection offered by the invention may also prove useful for improving its reliability.

One aspect of the invention is directed to a fuel cell comprising a stack of fluid distribution plates and polymer films comprising a zone that forms an ion-exchange membrane, each polymer film being interposed between two fluid distribution plates in order to form an individual cell. At least at the level of certain individual cells, the fuel cell comprises an overhanging lip made of an electrically non-conductive material, which overhangs relative to at least one end of the adjacent fluid distribution plates.

In all the embodiment variants set out below, each overhanging lip is associated with a polymer film. However, this is not in any way limiting; the overhanging lips could also be associated with the distribution plates.

DETAILED DESCRIPTION OF THE DRAWINGS

Figure 1:
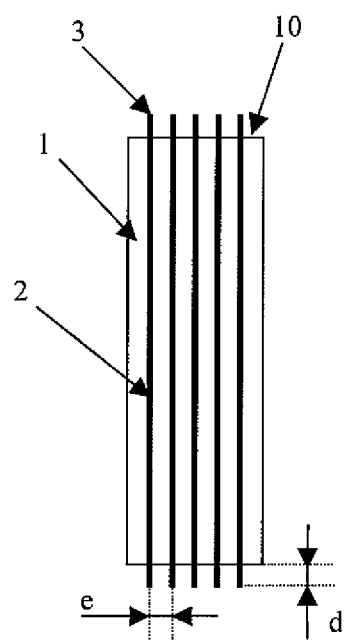
FIG. 1 is a diagram showing a first embodiment of a fuel cell according to the invention.

Seen in FIG. 1 is a part of an assembly forming a fuel cell: bipolar plates 1 having externally-accessible edges and polymer films 2. It is known that an individual electrochemical cell is (without this in any way limiting the invention) usually formed from the superposition of five layers, an ion-exchange polymer membrane formed on the polymer film 2, two electrodes comprising the chemical elements necessary for developing the electrochemical reaction, such as for example platinum, said electrodes being formed by a coating deposited on both sides of the membrane, and two gas diffusion layers that make it possible to ensure a homogeneous diffusion of the gases transported by the networks of the bipolar plates 1 over the whole of the surface forming the ion-exchange membrane.

The thickness of the bipolar plates 1 is equal to "e". It is seen in the first embodiment (FIGS. 1 and 2) that an extension of each polymer film 2 forms an overhanging lip 3 which overhangs relative to the bipolar plates 1 by a value, which on the drawing is equal to "d".

The bipolar plates 1 are in fact fluid distribution plates. They are referred to as bipolar plates because, except those at each end of this stack, they are each in contact with the anode of one cell and with the cathode of the adjacent cell.

Each bipolar plate 1 forms an equipotential line. The difference in voltage from one bipolar plate to the next is around 1 volt. When the fuel cell is in service, given the electrically conductive nature of the material of the bipolar plates in the most common cases (graphite, steel, etc.), the edges 10 of the bipolar plates are live. The set of overhanging lips 3 forms a sort of mechanical barrier which makes any contact with the edge 10 of the bipolar plates much more difficult. In particular, the accidental intrusion of a conductive foreign body will not succeed, when it has a size greater than the thickness of the bipolar plates, in creating a path of electrical conduction between one bipolar plate and the adjacent bipolar plate. Preferably, the fuel cell according to one of the claims comprises an overhanging lip at the level of each of the polymer films.

Whether or not there is an overhanging lip at the level of each polymer film, the fuel cell may be equipped with lips not over the whole of the perimeter but only where it is desired to reinforce the insulation because the risk of contact by an operator or the risk of short-circuiting by foreign bodies is higher. For example, the upper face and the side faces of the fuel cell are thus protected but the inner face is not.

In summary, the overhanging lip overhangs relative to the perimeter of the fluid distribution plates where it is desired to protect against contact with the edges of the bipolar plates, that is to say where it is desired to protect the side faces of the fuel cell.

Figure 2:
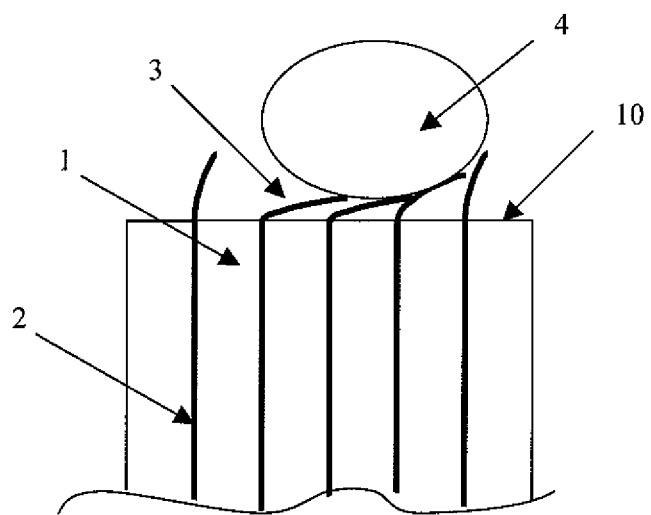
FIG. 2 shows the first embodiment when an object is moved close against said embodiment.

It is known that, usually, the polymer material used for the films 2 is flexible. In FIG. 2, it is seen that if an object 4 (or an operator's finger) approaches the fuel cell, this causes bending of the lip 3 of the flexible polymer film 2, namely the part which overhangs relative to the bipolar plates 1. Preferably, each polymer film overhangs by a value "d" which is greater than the thickness "e" of each bipolar plate 1. In this way, when the lips 3 of the polymer films 2 are bent over the edges 10 of each bipolar plate 1, said lips 3 completely cover the edges 10.

Even if someone puts their hand or a tool on the fuel cell when it is working, it will automatically form an electrically non-conductive barrier. The risk of electrical contact between an operator and a bipolar plate or between a tool and two adjacent bipolar plates is thus radically reduced.

Moreover, the presence of these lips 3 of each flexible polymer film 2 will lengthen the leakage path between one bipolar plate 1 and the adjacent bipolar plate 1. This also improves the electrical insulation between two adjacent bipolar plates.

The invention also extends to different embodiments of the overhanging lips, especially those which will be explained below.

Alternatively, the overhanging lip may be formed from one or more inserts 6 (see FIGS. 3 and 5) made from an electrically non-conductive material. Such an insert 6 is, for example, made from a composite material, for example of resin/glass fibre type, or from a fairly rigid polymer. In such a case (see FIG. 4), the electrical protection described above is also provided.

Figure 3:
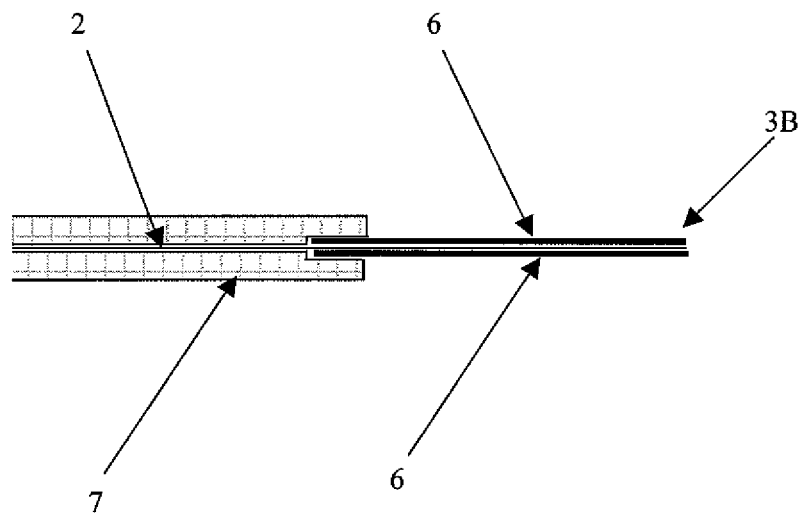
FIG. 3 is a diagram showing a second embodiment of a fuel cell according to the invention.
Figure 4:
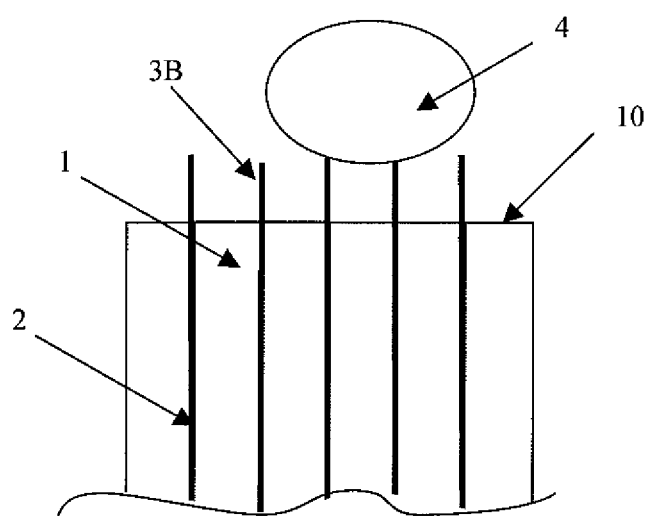
FIG. 4 shows the second embodiment when an object is moved close against said second embodiment.

Seen in FIG. 3 is a polymer film 2 with, on both sides of the chemically active zone forming the ion-exchange membrane, gas diffusion layers 7. The bipolar plates (not shown) extend over the same surface as the gas diffusion layers. Also seen, on both sides of an extension of the polymer film 2, are inserts 6, either made of a flexible polymer, or of a rigid polymer, or of a composite material. The insert 6 may be engaged in the end of the adjacent gas diffusion layer 7, as illustrated in the figures, or could only be flush with the latter. The gas diffusion layer 7 has a composition such that it can be squashed in order to adapt to the small overthickness in line with the insert 6. The assembly illustrated in FIGS. 3 and 4 forms a rigid lip 3B, that overhangs relative to the gas diffusion layers and therefore relative to the adjacent bipolar plates. In view of its composition, the lip 3B does not bend when an object 4 approaches the fuel cell. As a variant, it could be possible to implant an insert 6 only on one side of the polymer film 2.

Figure 5:
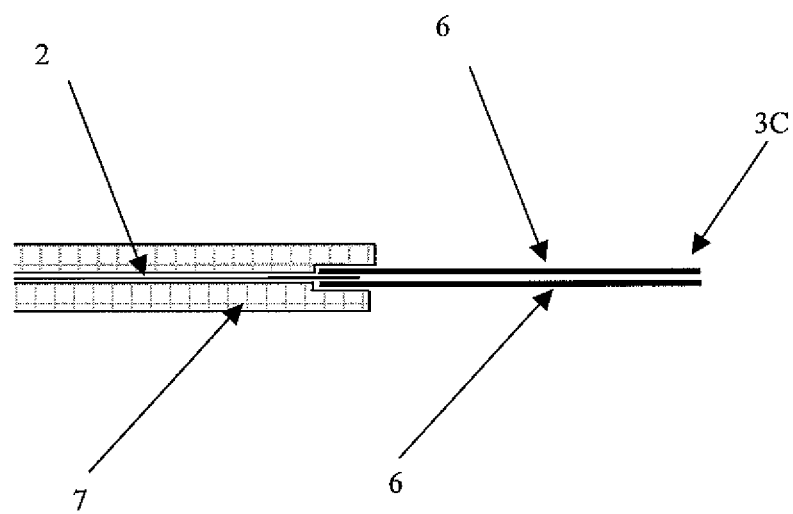
FIG. 5 is a diagram showing a third embodiment of a fuel cell according to the invention.

The variant illustrated in FIG. 5 differs from the preceding one in that the polymer film 2 does not overhang relative to the gas diffusion layers 7. This time, it is the inserts 6 which extend at the polymer film 2. The inserts 6 are necessarily engaged in the end of the adjacent gas diffusion layer 7, as illustrated in FIG. 5. For manufacturing reasons, the inserts are added over the perimeter of the polymer film 2. As a variant, it could also be possible to implant an insert 6 only on one side of the polymer film 2. The assembly illustrated in FIG. 5 forms a rigid lip 3C that overhangs relative to the gas diffusion layers and therefore relative to the adjacent bipolar plates, which does not bend when an object approaches the fuel cell.

It is also pointed out that, in the latter two variants, the insert 6 preferably forms a frame which surrounds the polymer film 2, which contributes to the rigidity of the lips 3B and 3C.

Thus, thanks to the invention, the lips that overhang in a certain manner insulate the bipolar plates on the outside and, when they are flexible, they are capable of covering the free end of each bipolar plate and thus offering a fairly effective electrical insulation. The safety regarding short circuits between two adjacent bipolar plates is improved and the risk of electrocution is greatly reduced.

The invention claimed is:

1. A fuel cell comprising a stack of fluid distribution plates and polymer films comprising a zone that forms an ion-exchange membrane, each polymer film being interposed between two fluid distribution plates in order to form an individual cell, wherein at least one individual cell comprises an overhanging lip made of an electrically non-conductive material, which overhangs relative to at least one end of the adjacent fluid distribution plates, wherein each lip overhangs relative to the adjacent distribution plates by a length "d" greater than the thickness "e" of the adjacent fluid distribution plates, and wherein each lip is configured so it can be bent over the entire thickness "e" of one of said adjacent fluid distribution plates.

2. The fuel cell according to claim 1, wherein each overhanging lip is associated with a polymer film.

3. The fuel cell according to claim 2, wherein the lip overhangs relative to the entire perimeter of the adjacent fluid distribution plates.

4. The fuel cell according to claim 2, wherein each overhanging lip is formed by an extension of a polymer film.

5. The fuel cell according to claim 4, wherein said polymer film is flexible.

6. The fuel cell according to claim 2, wherein each overhanging lip is formed by an insert made of an electrically non-conductive material.

7. The fuel cell according to claim 2, comprising an overhanging lip at each of the polymer films.

8. The fuel cell according to claim 1, wherein the fluid distribution plates, except those at each end of the stack, form bipolar plates.

9. The fuel cell according to claim 1, wherein each said overhanging lip is flexible.

* * * * *